X7478
R. Eastman,
Water Wheel,
Patented Mar. 11, 1833.
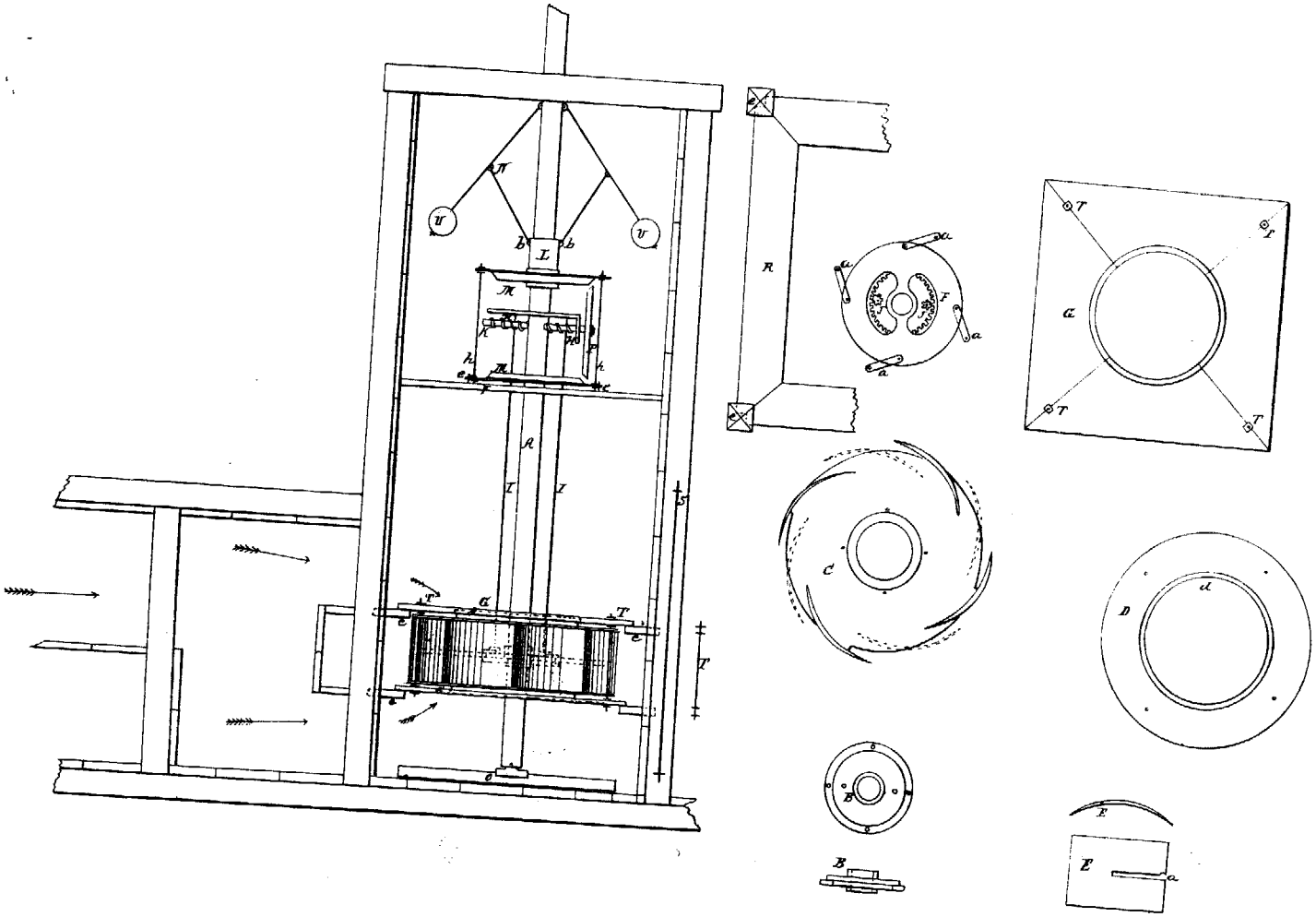

UNITED STATES PATENT OFFICE.

ROBERT EASTMAN, OF CONCORD, NEW HAMPSHIRE.

IMPROVEMENT IN THE CONSTRUCTION OF REACTING WATER-WHEELS.

Specification forming part of Letters Patent dated March 11, 1833.

*To all whom it may concern:*

Be it known that I, ROBERT EASTMAN, of Concord, in the county of Merrimac and State of New Hampshire, have invented certain improvements in the construction of the reacting water-wheel used for the driving of machinery by the reaction of water, by which improvements its action is rendered more perfect and it rendered self-regulating by the addition of a regulator or governor. It is also made peculiarly compact, while it still affords sufficient inlet and outlet for the water to operate in the most effectual manner; and I do hereby declare that the following is a full and exact description of my said improvements, reference being had to the drawings which accompany and make part of this specification.

The wheel may be made in whole or in part of cast-iron, or other materials may be employed in the construction. It may be cast in pieces like those represented in the drawings, or the form may be variously modified, while the same principles are retained. Its dimension may also be changed, and when of a very small size the number of floats may be reduced to fewer than eight, which is the number I generally employ, as shown in the drawings.

A is the shaft of the wheel, terminating below at the step on the bridge-tree O, which is capable of being raised or lowered by means of a suitable rod or rods, as shown at S. When eight floats are used, four of them are stationary and four are movable, and it is by means of the latter that the quantity of water to be expended is regulated.

D represents the top rim of the wheel, which has a projecting fillet *d* cast on it, which is made to fit exactly in the opening of the cistern piece or plate G. A similar rim is made for the under side of the wheel, but on this I usually place the fillet on the outer edge. These rims are to be attached to the stationary floats by means of screws or rivets on the flooring-piece C. The stationary floats, which may be cast in one piece with it, are shown by black lines, while the dotted lines represent the movable floats alternating with the former, and by their motion enlarging or diminishing the aperture at each of their ends. They are supported by bolts passing through them edgewise and through the upper and lower rims. The plate F, having upon it the jointed arms or connecting-rods *a a a a*, is intended to act on the movable floats, in doing which it receives its motion from a regulator or governor, to be presently described.

A side and edge view of one of the movable floats is given at E E, with the slot which admits of its being drawn by the connecting-rods nearer to the shaft A.

G G are cistern-plates which rest upon ledges *c c c c*. These ledges are also shown in the section R.

B is a center piece which I employ to connect the wheel to the shaft.

T T are the bolts which connect and support the cistern-pieces. The regulator or governor acts upon the same principle with those used for steam-engines and other machinery, and is only so modified as to adapt it to the purpose to which I apply it.

U U are the centrifugal balls, the jointed arms N of which act upon the sliding collar L.

There are two wheels M M, which I call the "upper and lower blank-wheels." In the upper blank-wheels the collar I turns freely, while it is so connected by means of a ring and set-screw as to cause the two to rise and lower together. The two blank-wheels are connected by the two bolts *n n*, and two pins rising from the plank V and passing through the ears *e e* serve to guide them steadily. The axis of the vertical blank-wheel P passes through the shaft A and has on each side of the shaft an endless screw K. These endless screws take into wheels H H, placed upon the rods I I for the purpose of causing them to revolve. When the centrifugal force is much increased, the regulator will bring the lower wheel M into contact with P, and when sufficiently decreased will bring the upper wheel M in contact with it, when the wheels H will be turned, and the pinions J J on the lower ends of the rods I I, taking into the teeth in the openings in the plate F and causing it to turn, will open or close the movable floats. At a medium speed neither of the wheels M M will be in contact with P. The regulator may, if preferred, be detached from the shaft and carried by a band or otherwise and be geared so as to operate on the rods I I. It may also be dispensed with entirely, and the wheel P or some appendage operating in the same way may be turned by hand so as to set the floats in any required position. The cistern-pieces G G, I prefer to make of wood, as they produce less friction than iron when accidentally brought into close contact with the wheel, and they are also when worn more readily and economically adjusted than if made of metal. As the water is admitted both above and below the wheel, its pressure is equalized, so that the weight of the column is not felt on the step. The two orifices likewise tend to give a full and equable supply of water to the wheel.

What I claim as my invention, and for which I ask a patent, is—

The making the floats of a reaction-wheel adjustable, as herein described, the application of the regulator or governor to render them self-adjusting, and likewise the arrangement for adjusting them by hand, enabling the operator to do so without the necessity of descending to the wheel or in any way disturbing the arrangement of the apparatus. In effecting these objects I do not intend to confine myself to the precise mode which is herein set forth, but to adopt any other which operates upon the same principle and produces a similar result.

ROBERT EASTMAN.

Witnesses:

JOHN FREDERICK CLARKE,

DAVID RALPH ARNOLD.